United States Patent Office 2,912,155
Patented Nov. 10, 1959

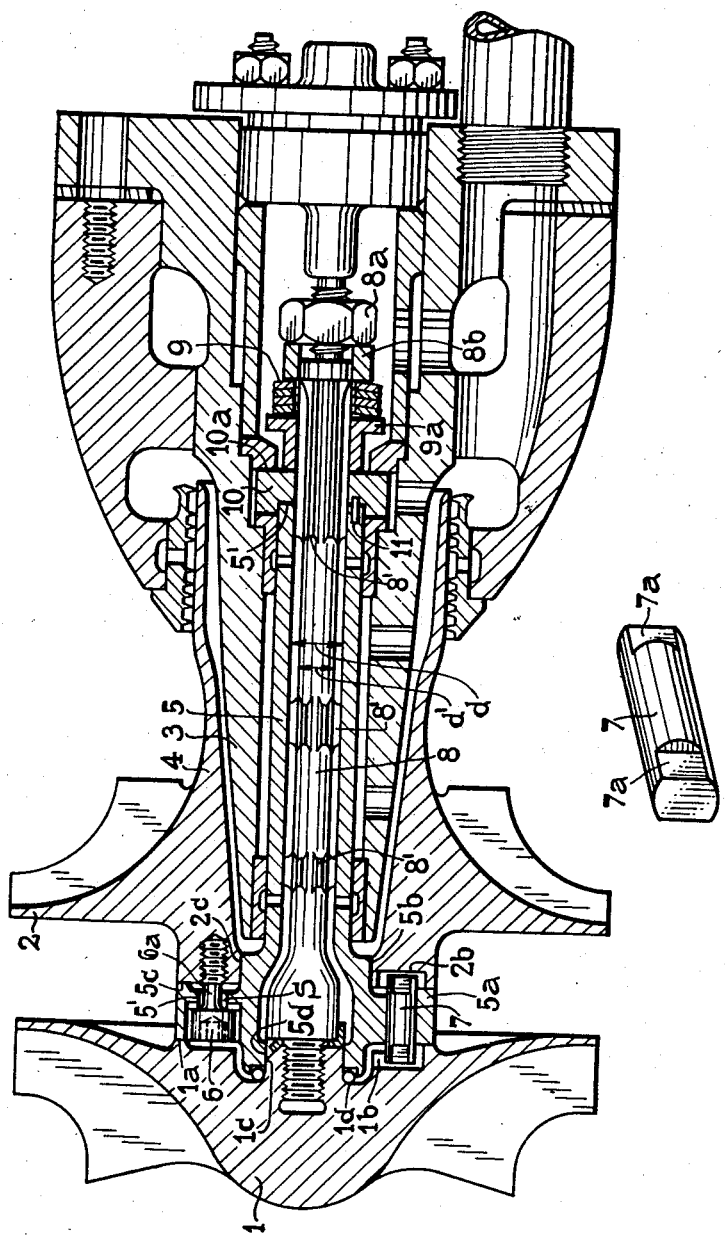

2,912,155

TURBO-COMPRESSOR ROTOR ASSEMBLIES

Alfred J. Buchi, Winterthur, Switzerland

Application April 8, 1957, Serial No. 651,217

Claims priority, application Switzerland April 27, 1956

4 Claims. (Cl. 230—116)

The present invention concerns turbo-compressor rotor assemblies comprising a tubular rotatable support shaft and in which the turbine and compressor rotors are drawn axially one against the other by a co-axial tension member secured to the turbine rotor and extending through the support shaft. According to this invention the support shaft is provided with a cylindrical flange which is axially clamped to the compressor rotor by screw-threaded coupling members. The turbine torque, however, is applied to the support shaft (and thence to the compressor rotor) independently of said screw-threaded coupling members by one or more driving elements. It is preferred that the screw-threaded coupling members comprise bolts, studs or the like which extend loosely through holes in said flange, the driving element being secured to said flange and having end portions projecting from each side thereof for engagement respectively with the turbine and compressor rotors, with a smaller driving clearance being provided between the ends of the driving element and the turbine and compressor rotors which they engage than is provided between the bolts, studs or the like and said holes in the flange. To reduce heat transmission from the turbine rotor to the compressor rotor and to the support shaft, the rotors are mounted on axially-spaced, narrow, annular surfaces provided on the flange.

It may be arranged that the turbine rotor and the compressor rotor are mounted on the support shaft in such manner that they are centred thereon, with the centering surface exposing to less intense heat during operation encircling the corresponding surface on the other part which is exposed to more intense heat. For example, the flange of the support shaft may be provided with an annular stepped portions which is received by a bore in the compressor rotor, the stepped portion and the bore constituting centering surfaces whereby the compressor rotor is co-axially mounted on the shaft. On the other hand the turbine rotor is centred on the shaft by providing at one end of the hollow support shaft, an inner cylindrical surface which receives a co-axial cylindrical stepped portion of the turbine rotor.

The tension coupling member for the rotors may be co-axially centred on the inner surface of the tubular support shaft by means (e.g. splines or the like) which are spaced axially of the shaft and project outwardly beyond the diameter of the tension member.

A turbo-compressor assembly in accordance with the present invention will now be described, by way of example only, with reference to the accompanying drawing which illustrates the assembly in axial section and which also shows, in perspective, a detail of construction of the assembly.

Referring to the drawing: the turbo-compressor assembly comprises the turbine rotor 1 and the compressor rotor or impeller 2. The turbo-compressor assembly is mounted on a tubular support shaft 5 which is mounted for free rotation within a fixed mounting 3 which, in the particular example illustrated, projects into the hub portion 4 of the compressor impeller 2. A tension coupling member 8 co-axial with the turbo-compressor rotor assembly draws the turbine rotor 1 axially against the compressor impeller 2 as later described.

The support shaft 5 is provided with a flange 5a to which the impeller 2 is secured by bolts 6. The tension member 8 draws the turbine rotor 1 axially against the flange 5a which is secured to the compressor impeller 2 by the bolts 6. According to a feature of the present invention, a driving element is provided to transmit the torque from the turbine rotor 1 to the support shaft 5 and thence to the compressor impeller 2. It is to be understood that the bolts 6 extend loosely through holes 5' in the flange 5a, there being a clearance space S between the stem 6a of each bolt and the hole 5'. Accordingly, it will be appreciated that the bolts 6 are provided only for the purpose of clamping the flange 5a axially to the impeller 2 of the compressor.

In the particular arrangement being described the driving element 7 (see the perspective sketch) comprises a pin having a cylindrical central portion which is received by, and secured to, the flange 5a. The end parts of the driving pin have opposite flat surfaces 7a which enter slots 1b and 2b formed respectively in the rotors of the turbine and of the compressor. Since the bolts 6 pass through the flange 5a with clearance and the surfaces 7a engage the slots 1b and 2b with less clearance torque is transmitted from the turbine rotor 1 to the compressor impeller 2 by the pins 7 so that the bolts 6 are not subject to shear.

The tension member 8 is screw-threaded at the end thereof remote from the turbine rotor and a nut 8a is mounted thereon, the nut 8a engaging a collar 8b which abuts spring members 9 which in turn engages a sleeve 9a. A bearing ring is located between the end face 5' of the tubular shaft 5 and the sleeve 9a, the ring 10 being clamped to the shaft when the nut 8a is drawn up. The ring 10 is in axial-bearing engagement with a surface 10a of a bearing member. An axially extending driving pin 11 couples the ring 10 to the tubular shaft 5 so that the two of them rotate together. It will be appreciated that when the nut 8a is drawn up the turbine rotor 1 is pressed axially against the flange 5a and it will be observed that the area of contact between the turbine rotor 1 and the flange 5a is through a relatively narrow annular surface 1a. Similarly, the connection between the flange 5a and the impeller rotor 2 due to tightening of the bolts 6 is through a relatively narrow annular surface 5c on the flange 5a. Both of said annular surfaces extend from the outer periphery of the flange 5a radially inwardly to approximately the outer edge on the holes 5' through which the bolts 6 pass.

The tension member 8 is supported within the tubular shaft 5 at the axially spaced regions 8'. The regions 8' are formed with splines or similar projecting members having the maximum diameter d which is greater than the diameter d' of the tension member. The splines or projections engage the inner surface of the tubular shaft.

A feature of the present invention resides in the means which are provided to mount the turbine rotor 1 concentrically on the support shaft 5. The rotor comprises a boss having a cylindrical surface 1c which is formed with an annular groove 1d. The surface 1c is received within a cylindrical inner surface 5d on the shaft 5. The turbine impeller is co-axially mounted on the shaft 5 by providing a stepped portion having a cylindrical surface 5b on the shaft, the stepped portion being received by a bore 2c of the compressor impeller. With this arrangement for the turbine rotor and the compressor impeller, it is arranged that the member of a pair of co-axial members which is received within the other of the pair is at a higher temperature during operation than said other member so that the inner member expands radially thereby to grip the encircling outer member.

What I claim is:

1. An overhung supported turbo-blower rotor including a separate turbine rotor for a hot actuating medium and a blower rotor for a relatively cool pressure medium, a common rotary hollow shaft, a central prolongation on the turbine rotor passing through the hollow shaft and projecting therebeyond, screw means on the projecting portion of the central prolongation, connecting same by pressure against the free end of the hollow shaft, a stationary bearing for the common hollow rotary shaft, a hub portion on the blower rotor into which the bearing extends axially partially, the hollow shaft having beyond the stationary bearing, an integral central connecting element for both of the rotors, fastening means extending axially for locating the blower rotor axially respecting the central connecting element, the screw means and central prolongation on the turbine rotor locating the turbine rotor axially respecting the central connecting element, an annular shoulder on the turbine rotor projecting axially against the central connecting element, and centering means to center each of the rotors independently with the connecting element, the central connecting element being defined as a flange, a cylindrical outer surface of the flange spacing the rotors from each other, and said means for rotational connection of the rotors including a peg passing through the flange and projecting in both the turbine and blower rotors.

2. An overhung supported turbo-blower rotor including a separate turbine rotor for a hot actuating medium and a blower rotor for a relatively cool pressure medium, a common rotary hollow shaft, a central prolongation on the turbine rotor passing through the hollow shaft and projecting therebeyond, screw means on the projecting portion of the central prolongation connecting same by pressure against the free end of the hollow shaft, a stationary bearing for the common hollow rotary shaft, a hub portion on the blower rotor into which the bearing extends axially partially, the hollow shaft having beyond the stationary bearing, an integral central connecting element for both of the rotors, fastening means extending axially for locating the blower rotor axially respecting the central connecting element, the screw means and central prolongation on the turbine rotor locating the turbine rotor axially respecting the central connecting element, an annular shoulder on the turbine rotor projecting axially against the central connecting element, and centering means to center each of the rotors independently with the connecting element, the central connecting element being defined as a flange, a cylindrical outer surface of the flange spacing the rotors from each other, and the centering means being such that the surface of the component exposed to less intensive heating during operation encircles the surface of the component exposed to more intensive heating.

3. An overhung supported turbo-blower rotor including a separate turbine rotor for a hot actuating medium and a blower rotor for a relatively cool pressure medium, a common rotary hollow shaft, a central prolongation on the turbine rotor passing through the hollow shaft and projecting therebeyond, screw means on the projection portion of the central prolongation connecting same by pressure against the free end of the hollow shaft, a stationary bearing for the common hollow rotary shaft, a hub portion on the blower rotor into which the bearing extends axially partially, the hollow shaft having beyond the stationary bearing, an integral central connecting element for both of the rotors, fastening means extending axially for locating the blower rotor axially respecting the central connecting element, the screw means and central prolongation on the turbine rotor locating the turbine rotor axially respecting the central connecting element, an annular shoulder on the turbine rotor projecting axially against the central connecting element, and centering means to center each of the rotors independently with the connecting element, the central connecting element being defined as a flange, a cylindrical outer surface of the flange spacing the rotors from each other, and said flange including a cylindrical stepped portion received within a bore in the blower rotor, with the stepped portion and the bore centering the blower rotor on the shaft, the end of the shaft adjacent the turbine rotor having an inner surface receiving an outer cylindrical surface of a boss on the rotor and the boss centering the turbine rotor on the shaft.

4. An overhung supported turbo-blower rotor including a separate turbine rotor for a hot actuating medium and a blower rotor for a relatively cool pressure medium, a common rotary hollow shaft, a central prolongation on the turbine rotor passing through the hollow shaft and projecting therebeyond, screw means on the projecting portion of the central prolongation connecting same by pressure against the free end of the hollow shaft, a stationary bearing for the common hollow rotary shaft, a hub portion on the blower rotor into which the bearing extends axially partially, the hollow shaft having beyond the stationary bearing, an integral central connecting element for both of the rotors, fastening means extending axially for locating the blower rotor axially respecting the central connecting element, the screw means and central prolongation on the turbine rotor locating the turbine rotor axially respecting the central connecting element, an annular shoulder on the turbine rotor projecting axially against the central connecting element, and centering means to center each of the rotors independently with the connecting element, the central connecting element being defined by a flange, a cylindrical outer surface of the flange spacing the rotors from each other, and said means for rotational connection of the rotors including a peg passing through the flange and projecting in both the turbine and blower rotors, with the peg including opposite flat surfaces which co-act respectively with grooves formed in the turbine and blower rotors.

References Cited in the file of this patent

UNITED STATES PATENTS

| 2,184,197 | Schutte | Dec. 19, 1939 |
| 2,480,095 | Buchi | Aug. 23, 1949 |

FOREIGN PATENTS

| 1,125,754 | France | Nov. 7, 1956 |